(12) United States Patent
Muddiman et al.

(10) Patent No.: US 6,349,737 B2
(45) Date of Patent: **\*Feb. 26, 2002**

(54) BURSTING DISC ASSEMBLY RETAINING RING WITH A CLOVER LEAF CUTTING PATTERN AND PROJECTION

(75) Inventors: G. Scott Muddiman; John D. Goddard, both of Burlington (CA)

(73) Assignee: Process Equipment, Inc., Burlington (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/782,658

(22) Filed: Feb. 13, 2001

Related U.S. Application Data

(63) Continuation of application No. 09/475,182, filed on Dec. 30, 1999, now Pat. No. 6,220,269.

(51) Int. Cl.⁷ .............................................. F16K 17/14
(52) U.S. Cl. .............................. 137/68.29; 137/68.26; 220/89.3
(58) Field of Search ................... 137/68.29, 68.26; 220/89.3

(56) References Cited

U.S. PATENT DOCUMENTS

| | | |
|---|---|---|
| 3,704,807 A | 12/1972 | Lidgard |
| 4,119,236 A | 10/1978 | Shaw et al. |
| 4,211,334 A * | 7/1980 | Witten et al. ............... 220/89.3 |
| 4,236,648 A | 12/1980 | Wood et al. |
| 4,269,214 A * | 5/1981 | Forsythe et al. ..... 137/68.29 X |
| 4,278,181 A * | 7/1981 | Wood et al. ................ 220/89.3 |
| 4,301,938 A * | 11/1981 | Wood et al. ................ 220/89.3 |
| 4,342,988 A | 8/1982 | Thompson et al. |
| 4,444,214 A | 4/1984 | Paul, Jr. |
| 4,479,587 A * | 10/1984 | Mundt et al. ......... 137/68.29 X |
| 4,580,691 A | 4/1986 | Hansen |
| 4,669,626 A | 6/1987 | Mozley |
| 4,682,619 A * | 7/1987 | Clift et al. ............ 137/68.29 X |
| 4,691,729 A * | 9/1987 | Clift ..................... 137/68.29 X |
| 4,759,460 A | 7/1988 | Mozley |
| 4,795,051 A | 1/1989 | Ou |
| 5,002,088 A | 3/1991 | Engelhardt et al. |
| 5,082,133 A * | 1/1992 | Farwell et al. ........ 137/68.29 X |
| 6,220,269 B1 * | 4/2001 | Muddiman et al. ....... 137/68.29 |

FOREIGN PATENT DOCUMENTS

| | | |
|---|---|---|
| CA | 1054022 | 5/1979 |
| CA | 1244315 | 9/1984 |
| CA | 2001315 | 10/1989 |
| CA | 2128492 | 7/1994 |
| CA | 2205174 | 6/1995 |
| GB | 2316450 A | 2/1998 |

\* cited by examiner

*Primary Examiner*—John Rivell
(74) *Attorney, Agent, or Firm*—Watts, Hoffman, Fisher & Heinke, Co., L.P.A.

(57) ABSTRACT

A support ring adapted to support a rupturable rupture disc member in a rupture disc assembly. The support ring includes an upper surface, a lower surface, a central aperture defined by an inner peripheral edge and at least one tear-initiating projection, and having a cutting means extending inwardly from the inner peripheral edge and below the upper surface and adapted to cut the rupture disc member. The cutting means includes a plurality a curved cutting portions, each of the plurality of curved cutting portions including an inner arc section extending closer to the inner peripheral edge than other portions of the curved cutting portion.

35 Claims, 4 Drawing Sheets

BURSTING DISC ASSEMBLY RETAINING RING WITH A CLOVER LEAF CUTTING PATTERN AND PROJECTION

CROSS REFERENCE TO RELATED APPLICATION

This application is a continuation of U.S. application Ser. No. 09/475,182, filed Dec. 30, 1999, now issued as U.S. Pat. No. 6,220,269, on Apr. 24, 2001, entitled "Bursting Disc Assembly Retaining Ring With A Clover Leaf Cutting Pattern and Projection" and is incorporated herein in its entirety by reference.

FIELD OF THE INVENTION

This invention relates to a pressure relief valve, and more particularly to a pressure relief valve being of a metal rupture disc in the form of thin rupture members having a metal liner body with a weakened portion including, in the form of a scored pattern, where the metal liner is placed in juxtaposition with a bursting disc.

BACKGROUND OF THE INVENTION

The present invention relates to safety pressure relief devices and, in particular, to rupture disc assemblies, including reverse buckling rupture discs, and also to methods of manufacturing such rupture discs and assemblies.

Rupture discs have been known in this art for many years. Normally, the rupture discs are manufactured to have a rupturable membrane to provide a safety mechanism to relieve excessive pressure within an over-pressurized system or vessel. The rupture disc and or rupture disc assemblies are typically placed within such a system or vessel so as to prevent the flow of a liquid or a gas through such a device until the rupture disc ruptures through excessive or overpressure loads. Typically, rupture discs have a score pattern formed by cuts, machined or by other conventional methods into the dome portion of the disc to enable the disc to buckle and to burst when under excessive pressure.

Rupture discs having support rings providing cutting projections have been used, but are restricted in use, being capable of use with gases only and sometimes restricted in pressure range. Obviously, if a rupture disc assembly could be developed which had better operating characteristics, including the ability to be used within a gas and or liquid environment capable of low and or high burst pressures, all without reducing the economic viability of such discs, there could be a wider application for the use of rupture discs assemblies.

SUMMARY OF THE INVENTION

With the present invention, it has been found that by providing a rupture disc assembly having a support ring including a projection and a predetermined configuration for the continuous score line, in combination with a rupture disc, the disadvantages of using standard rupture discs with conventional support rings are overcome cost-wise and the combination of the present invention permits a wider range of application for varying liquid and gas usages, and varying burst pressures.

The present invention provides a rupture disc combination which permits the use of rupture disc members in association with a certain type of rupture disc assemblies which overcomes the disadvantages with rupture discs assemblies per se, and yet provides the advantages of certain features of known rupture discs.

It is therefore one aspect of the invention to provide in a rupture disc assembly having a support ring adapted to support a rupturable rupture disc member; said support ring including an aperture, an upper and lower surface and a continuous side surface, the improvement wherein the support ring includes contiguous cutting means about the inner peripheral wall, the cutting means comprising a plurality of adjacent arcuately contoured cutting means having an innermost surface of the arcuate contour spaced at a closer distance to said inner peripheral wall than outer ends of the arcuate contour.

In another aspect of the present invention there is provided in a rupture disc assembly having a support ring adapted to support a rupturable rupture disc member; the support ring including an aperture, an upper and lower surface and a continuous side surface, the improvement wherein the support ring includes engaging means for engaging a ruptured disc after rupture of the same, the engaging means comprising a projection extending upwardly from one of the surfaces of the support ring and extending inwardly of the surface over the aperture to thereby engage a displaced ruptured disc.

In another aspect of the present invention there is provided in a rupture disc assembly having a support ring adapted to support a rupturable rupture disc member; the support ring including an aperture, an upper and lower surface and a continuous side surface, the improvement wherein the support ring includes a contiguous cutting surface operatively associated with said projection, the cutting surface positioned on said inner peripheral portion on the support ring, the projection of the cutting surface having a generally clover-leaf configuration.

In various alternative embodiments, the device according to any of the above aspect, the disc further includes a dome having a pre-determined transition radius between the dome and the support ring.

In various alternative embodiments, the support ring includes a transition radius substantially corresponding to that of the disc.

In alternative versions, the support ring transition radius includes a diameter of the transition radius being smaller than the transition radius of the disc.

Desirably, in accordance with the present invention, there is provided in a rupture disc having a rupturable rupture member together with a support system including a support ring associated with the rupture disc, the support ring having a projection formed within the ring adapted to retain post burst disc material, the improvement wherein the rupture disc supporting ring comprises a predetermined continuous score line therein adapted to cut the rupture disc when the disc buckles at a predetermined pressure, the support ring with the continuous cut or score line being in operative association with the projection formed in the support ring.

It is therefore another aspect of the present invention to provide a bursting disc in combination with a support ring having a projection formed on one side of the ring in combination with a continuous score pattern is of a generally clover-leaf configuration.

DETAILED DESCRIPTION OF THE PREFERRED EMBODIMENT

Figure 1:
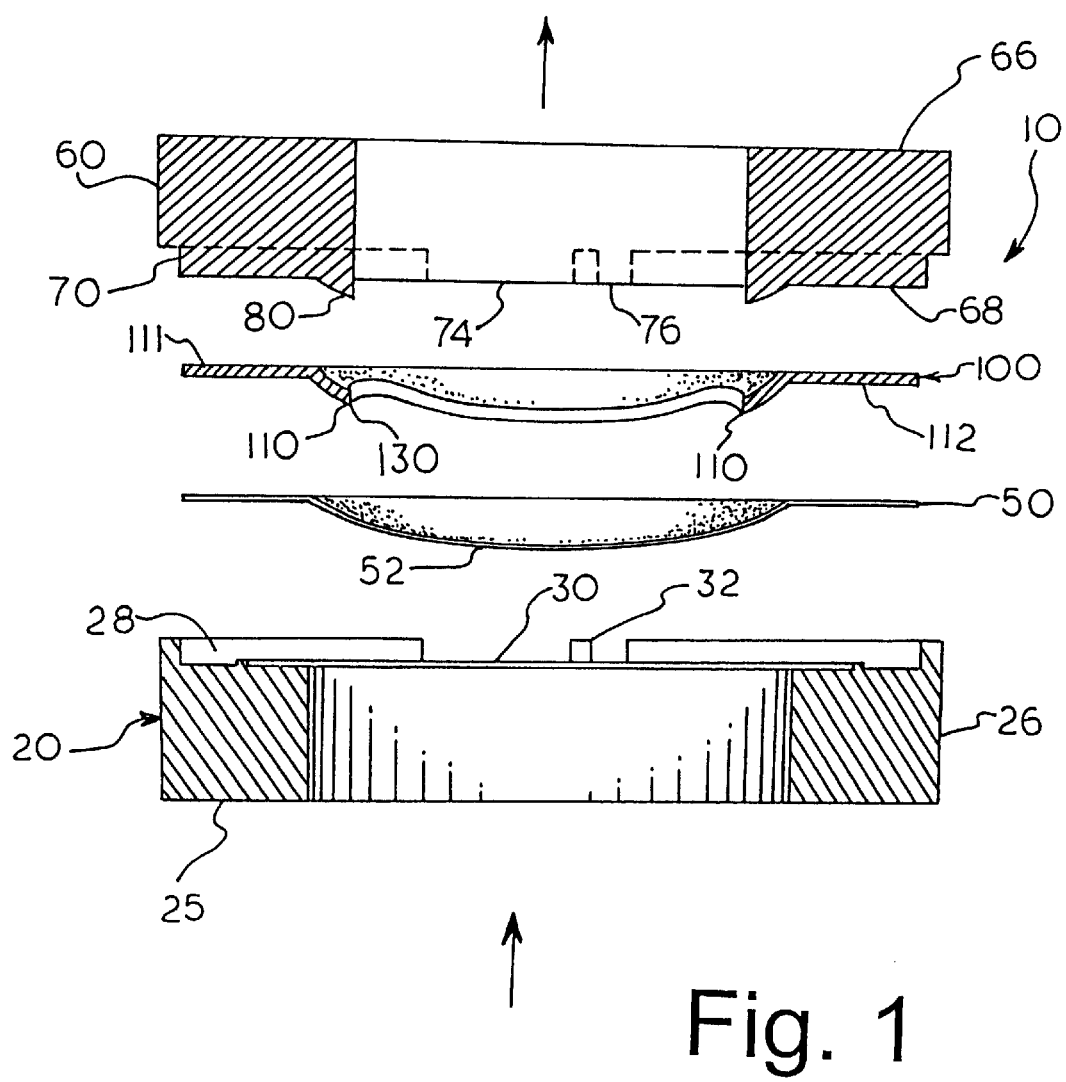
FIG. 1 is an exploded cross-sectional view of a bursting disc assembly.
Figure 8:
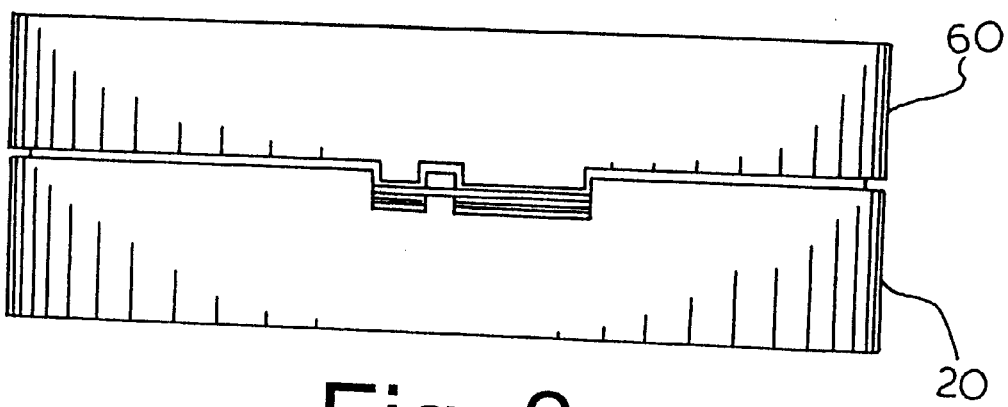
FIG. 8 is a side view of the assembled device.

For purposes of description herein the terms upper, lower, vertical and horizontal along with other directional references shall be relative to the invention as oriented in FIGS. 1 and 8, as illustrated in a pressure to non-pressure flow direction. It should also be understood that the various disclosed embodiments are merely exemplary and are utilized in a manner as would be readily understood by a person in the art.

The assembly as generally indicated by reference numeral 10, designates a rupture disc assembly including, in a pressure to non-pressure direction sequential relationship, a lower support holder or flange 20, a rupture disc 50, a support ring 100 and an upper support holder or flange 60. The assembly 10 when in use is securely held in an assembled condition through any conventional means, such as through the use of bolts or other mounting arrangements. The support ring 100 includes a projection or tongue member 121 formed in one side of the ring 100, and a continuous cutting surface 130 formed in the remaining non-projection sides of the ring (see FIG. 3).

The assembly 10 may be positioned within a safety release structure (not shown), such as a vent or pressure release valve assembly, and is normally adapted to prevent the flow of a liquid or a gas, in high and/or low pressures, through the assembly under a normal or predetermined burst pressure. The disc 50 is adapted to rupture or provide relief for excessive pressure when the predetermined maximum burst pressure of a bursting disc is exceeded.

When viewed from a pressure side to the non-pressure side of the device 10, there is provided a lower support holder or flange 20, which is positioned adjacent the lower surface of a bursting disc 50. The lower support holder or flange 20 may be constructed of any suitable material known in the art. The support holder or flange 20 in use is adapted to provide a secure seal against leakage between the disc 50 and the portion of the pressure vessel into which the assembly 10 is placed.

Figure 6:
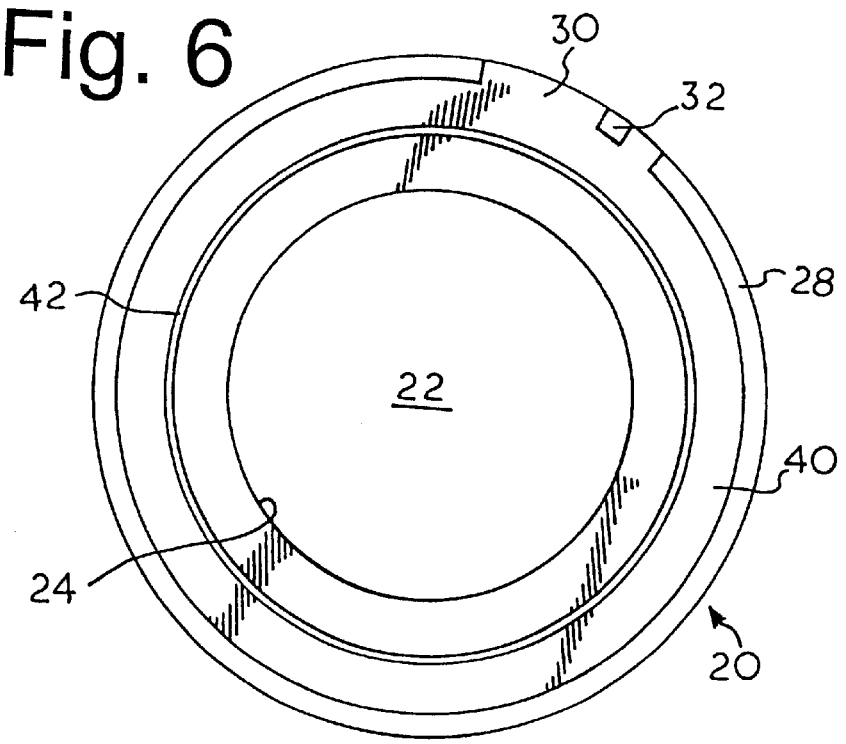
FIG. 6 is a top view of the lower holder.

As illustrated in FIG. 6, the lower support holder or flange 20 is of a generally circular or ring configuration, having a centralized aperture or bore 22, an inner peripheral wall 24 and an outer circumferential wall 26, a lower surface 25 (FIG. 1) and an upper annular surface or inner seating surface 40 around the centralized aperture 22 of the flange 20. In a preferred embodiment, the outer wall portion 26 of the lower holder or flange 20 extends above and around the annular surface 40, having a generally extending peripheral outer rim portion 28. Formed within the surface 40, through any conventional means such as milling, die forming, tooling or the like, is a circumferential raised projection or member 42, spaced inwardly of the outer rim wall 28. Raised member or projection 42 is adapted to provide a protuberance against which disc 50 abuts. When the assembly 10 is in a fully assembled condition, the raised projection or member 42 is adapted to securely retain the disc 50 against the support ring 100 and the support holder 20. As the assembly 10 is assembled and secured through conventional means, the pressure between the flange portion of the disc and the raised projection or member 42 allows for the flange portion to form or bend onto the projection thereby providing a seal and retaining the disc 50 in place.

In a preferred embodiment, the outer rim 28 is interrupted and provided with a gap portion or interruption 30. Most preferably the gap portion 30 is provided or interrupted by a segment 32 of the outer rim or wall portion, wherein the segment or segments are adapted to match or fit with a corresponding or mating portion on a subsequent element of the assembly. In a preferred embodiment, the raised projection or member 32 is spaced midway between the outer rim 28 and the inner ring wall 24.

Figure 3:
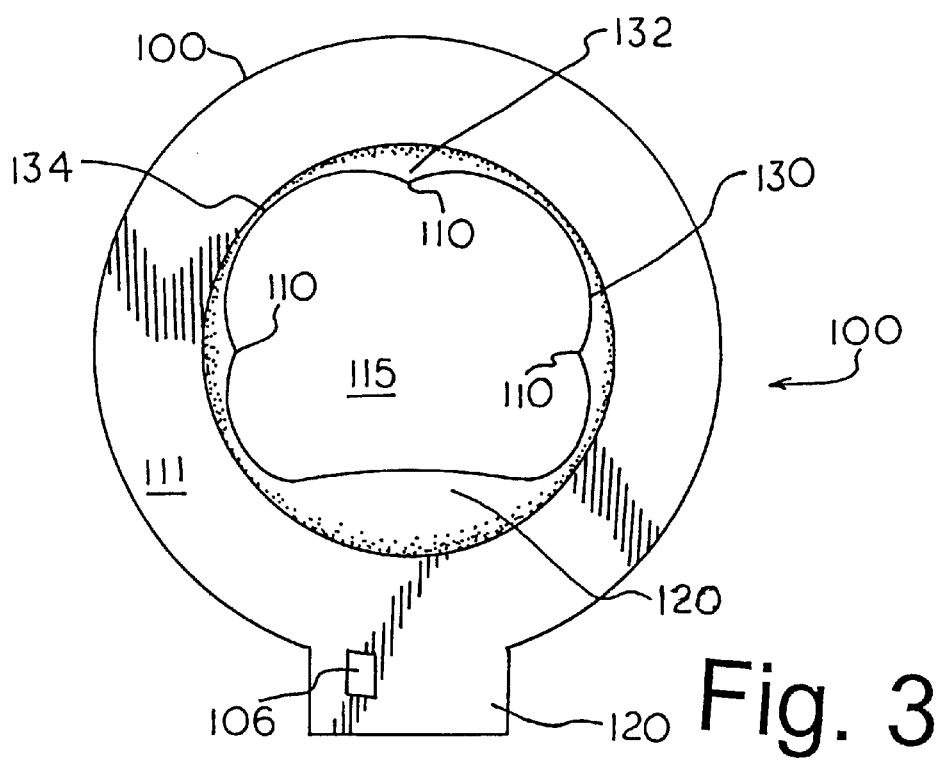
FIG. 3 is a top view of a support ring.

As illustrated in FIG. 3, the support ring 100 includes a handle portion 120. The support ring 100 is of a generally circular configuration, having an upper surface 111 and a lower surface 112, the ring being adapted through dimension and position to fit snugly within the assembly 10 as shown in FIGS. 1, and 8. The support ring 100 further includes a central aperture 115, corresponding to that of the disc and flanges 20 and 60. The support ring 100 has an inner peripheral edge 116 and an outer circumferential edge 117 spaced apart by a generally annular section. The inner peripheral edge 116 includes a projection or hinge member 121, a series of downward projections 110, and an opening pattern or cutting edge 130 extend either side of the projections 110. The projection or hinge member 120 is formed at a predetermined point along the inner ring surface, the remaining portion providing the opening pattern or cutting edge 130. The cutting edge 130 has a generally continuous configuration, which according to the present embodiment is of a generally clover leaf pattern.

As shown in FIG. 1, the projections 110 and the cutting edge 130, and projections 110 of the support ring 100, when viewed from a pressure side to a non-pressure side perspective, depend or otherwise extend downwardly below the horizontal axis of the supporting ring 100. As shown in an assembled state, the cutting edge 130 and projection member 121 depend into the concavity of a dome portion 52 of the disc 50, wherein the transition radius and diameter is substantially similar to that of the disc. The support ring inner peripheral edge 116 has a transition region 90 including a predetermined transition radius and transition diameter, discussed in detail below.

The opening pattern or cutting edge 130 in the example shown in FIG. 3, is of a generally clover leaf configuration, extending continuously along the inner peripheral portion 116 of the supporting ring 100. Most desirably, the cutting member 130 having a generally clover leaf configuration depends from the horizontal plane of the support ring 100 towards and within the dome portion 52 of the disc 50. The cutting edge 130 includes the tear initiation points 110, and arcuately curved continuous cutting portions 134. The cutting edge has an angle generally being between 50 and 70 degrees, and most desirably about 60 degrees. The arcuately curved cutting portions 134 include inner arcs 134a which substantially coincide with a bore 62 of an upper support holder 60.

The cutting edge 130 configuration provides for a non-fragmenting burst pattern of the disc, although other suitable angles may be used. A method of forming this cutting pattern is described in further detail below.

As shown in FIG. 3, the outer circumferential edge of the support ring 100 includes the projection 120. Formed within the handle projection 120 through any conventional means is a slot or aperture 106, adapted to aid in the proper assembling of the assembly 10 by being able to precisely position the support ring 100 with respect to receive the lower holding member 20.

Figure 2:
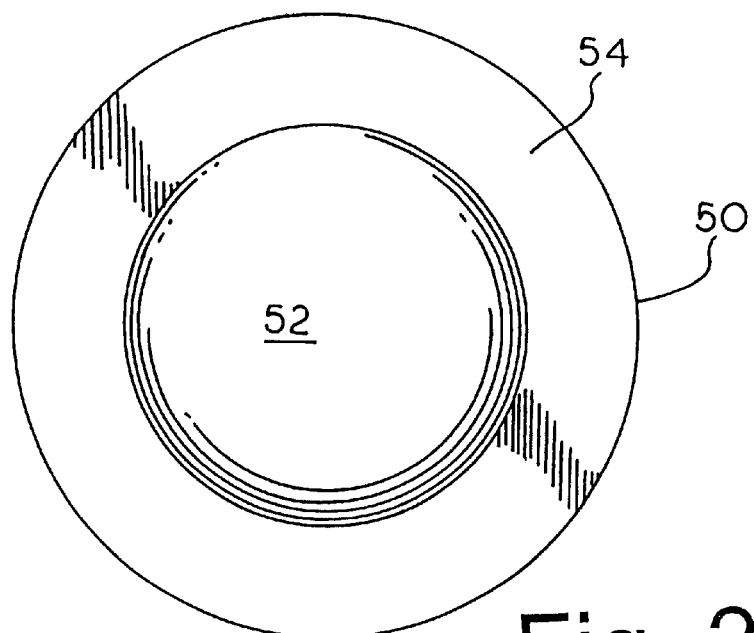
FIG. 2 is a top view of a rupture disc.

As illustrated in FIGS. 1 and 2, the disc 50 is of a conventional type commonly referred to as a reverse buckling disc, fabricated from a conventional metal material such as steel, steel alloy or other, and is adapted to tear upon reversing along the predetermined cutting pattern 130 on the support ring 110 when a pressure load exceeds the predetermined pressure load of the rupture disc 50. The rupture disc 50 includes the central portion or dome portion 52, and a flange or rim portion 54, and is adapted to be positioned with the dome 52 facing in a pressure flow direction between the support ring structure 100 and the lower flange 20. Disc 50, when in use and under excessive pressure, is adapted to reverse buckle towards the support ring 110 and the projection member 120. The dome portion 52 of the disc 50 is cut or otherwise opened against the clover leaf pattern cutting edge 130 immediately after which the burst or buckled disc 50 is wrapped around the projection 121.

The disc 50 may be of any conventional type, such as a non-scored reverse bursting disc. When utilized in accordance with the present invention, no score lines are required as the support ring 110 as described in detail below includes a cutting formation which provides for the serration and non-fragmentation of the disc 50. According to a preferred embodiment, when using a non-scored reverse buckling disc, the present invention is able to be utilized within both gaseous and liquid environments, and for both high and low burst pressures in both gaseous and liquid environments.

Most preferably, the disc 50 includes a transition region 45 FIG. 2 having a predetermined transition radius and diameter and the support ring 100 includes the transition region 90 having a predetermined transition radius and diameter. The transition radius between the dome portion 52 of the rupture disc and the peripheral portion is approximately identical in both the rupture disc and the support ring. Desirably, the diameter of the transition radius of the support ring 100 is approximately 0.010" to 0.020" smaller than the transition radius of the disc 50.

Figure 4:
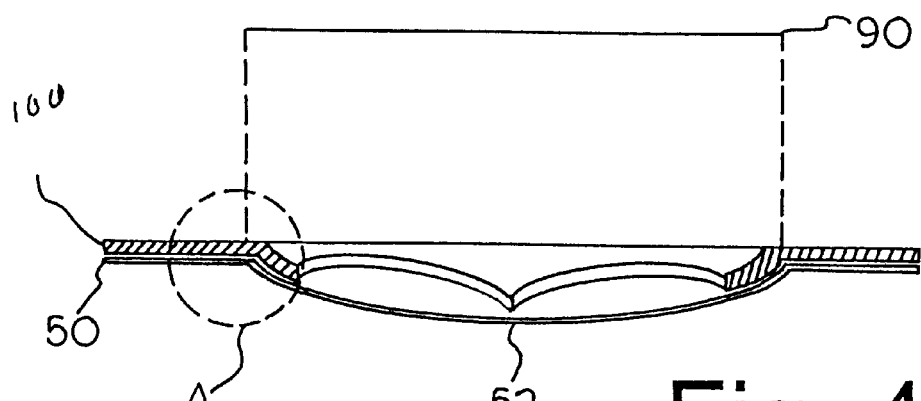
FIG. 4 is a cross-section view of the disc and support ring illustrating the transition diameter.
Figure 5:
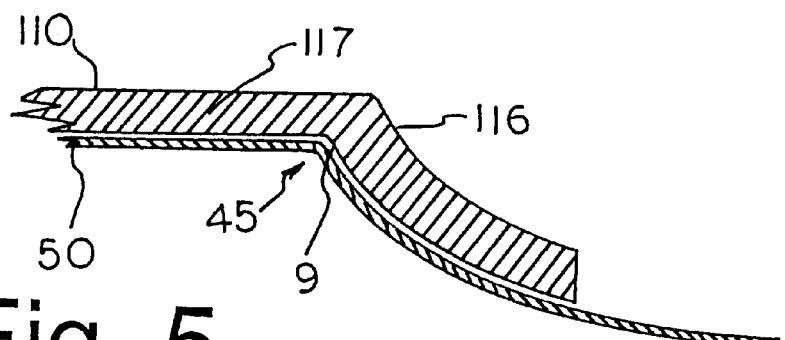
FIG. 5 is a enlarged view of the portion in circle A of FIG. 4.

As illustrated in FIGS. 4 and 5, the transition diameter and radius of the support ring 100 and the disc 50, as indicated above, are substantially similar, with the support ring being adapted through dimension and position to coincide with the disc 50. The transition region 90 of the support ring 110, as generally indicated by reference numeral 90, has a predetermined diameter and radius corresponding to that of disc 50. These ratios of course will vary depending upon the size and diameter of the disc being used, as will be understood by one skilled in the art.

Figure 7:
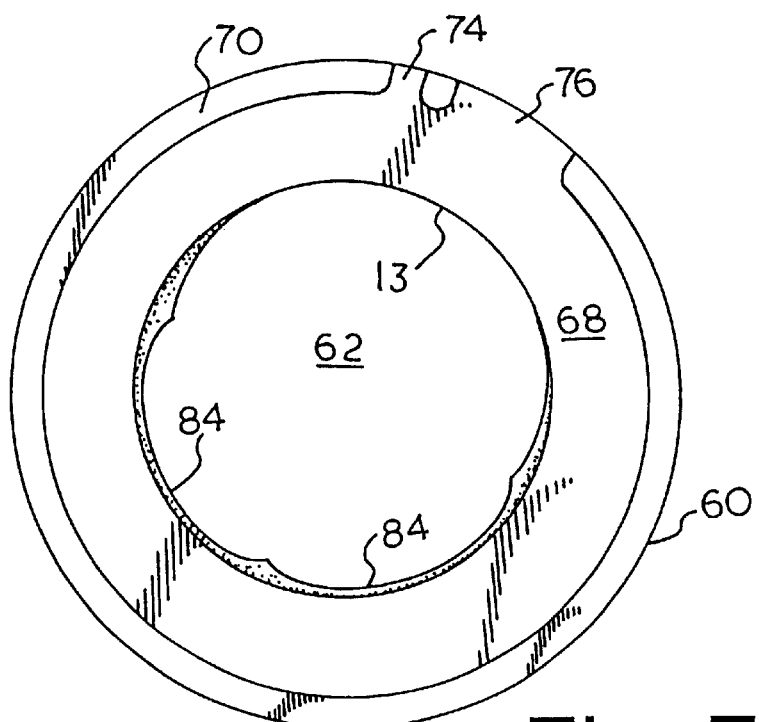
FIG. 7 is a view of the upper holder viewed from below.

A second upper holder or flange 60 is positioned abutting the support ring 100, as shown in FIGS. 1 and 7, on the non-pressure side of the disc 50. The upper support holder or flange 60 is adapted to provide a secure seal against leakage between the non-burst disc 50 and the non-pressure side of the assembly 10 when placed within a pressure vessel. The upper support holder 60 is similar to that of the lower support holder or flange 20, wherein the upper or non-pressure side support holder or flange 60 has a generally cylindrical configuration including a central aperture 62, having a defined bore dimension, a continuous side wall 64 and upper and lower surfaces 66 and 68, respectively. The upper support holder 60 includes a corresponding or mating portion 70 having a circumferential or annular seat to that of the outer rim of flange 20. Alternatively, the mating portion 70 of the upper support holder 60 is interrupted by spaced apart projections 74 and 76, extending from the side wall 64. Projections 74 and 76 are dimensioned to correspond with the gap portions 30 and 32 of the outer rim 28. The corresponding projections of the upper support holder 60 aid in the proper seating and assembly of the ring assembly 10 by ensuring that the gap portions and projections are mated correctly in an abutting relationship. If the upper and lower support holders 20 and 60 are not properly fitted together, they will not properly align, and the assembly would not be able to be assembled in the relationship illustrated in FIG. 1.

Desirably, as shown in FIGS. 1 and 7, the bore 62 of the upper support holder 60 is provided with depending support 80 adapted to support the cutting edge 130. Depending support 80 includes corresponding support projections 82 adapted to aid in supporting the support ring cutting or tear initiation points 110. Depending support 80 includes arcuately curved sections 84 (FIG. 7) adapted to reinforce or support arcuately curved members 134. The depending support 80, aids in supporting the cutting edge 130 when the predetermined burst pressure of a reverse rupture disc has been exceeded and the disc reverses and is cut open on the tear initiating members 110 and the cutting edge 130. Typically, this pressure is substantial and the bursting of the disc 50 is quite rapid and places pressure upon the support ring cutting edge 130. As such it is desirable to support the cutting pattern in such a way that substantially all of the cutting surfaces are supported against undesirable bending or twisting during the serration or cutting of the disc 50. Most preferably the projections 80 have the substantially similar transition radius and transition diameter to that of the support ring and rupture disc. By having the innermost segments of the contoured configurations coincide with the defined bore of the upper support holder 60, the present invention enables a bursting disk to be applicable for both gas and liquid applications and for high and low pressure applications.

In use, the assembly 10 is clamped in a pressure line (not shown). The lower support holder or flange 20 is placed toward the pressure flow, followed in an abutting and sealed sequential relationship, the reverse buckling disc 50, the support ring 100 and the upper support holder or flange 60, positioned such that any pressure must first contact the disc 50. When pressure in the vessel is greater than the rupture pressure of the rupture disc 50, the disc reverse disc pressure load is exceeded and upon rupture, the pressure is relieved through the assembly 10.

As the reverse buckling disc 50 reverses upon itself, the dome or concave convex portion 52 of the disc is forced against the cutting edge pattern 130 of the support ring 110. The cutting pattern 130 effectively cuts the disc 50 along the continuous cutting edge such that the cutaway portion of the disc folds or hinges along the projection member 121.

In a further alternative embodiment, the upper support holder or flange 60 includes a depending projection 80, having a substantially similar configuration to that of the cutting pattern of the support ring 110. This depending projection provides for additional support of the cutting edge 130 during the bursting of the disc 50.

Desirably, a method for forming the support ring 100 includes providing a blank for use as a support ring is manufactured through conventional means, i.e. pressing, cutting etc., resulting in a bulged out or domed shape configuration. Ideally, once formed, the disc 50 includes the flange portion 54, and a concave/convex dome 52, and a pre-determined transition region 45 having a transition radius and transition diameter substantially equal to that of a corresponding support ring 100. As understood, the term transition radius used herein is used to describe the area between the flange portion of the disc and the dome portion of the disc having a predetermined radius and angle. The transition diameter is understood to describe the length of the area between the flange sides.

In a preferred embodiment, the transition diameter of the transition region 90 of the support ring 110 has a predetermined length alphaα, (FIG. 4) which is substantially similar to that of the of the transition diameter betaβ of the disc 50. The substantially similar transition diameters provide for a closer or more snug fit between the disc 50 and the support ring 110 which allows for less movement of the disc upon burst and aids in the efficient cutting of the disc 50 upon the tear initiation points or cutting points 110 and arcuate cutting members 134.

A preferred method of forming the cutting edge pattern 130 of the support ring 110 is utilizing a precision cutting means, such as a laser, to effectively cut or otherwise form the clover leaf cutting pattern 130 in the pre-formed blank. This provides for a more precise cutting of the support ring surface, as the laser optimally cuts at a 90 degree angle to the ring surface. The laser provides (or forms) a cutting edge having a predetermined angle extending for at least a major portion of the pattern. As stated, the cutting edge 130 has a predetermined angle of between 50 and 70 degrees, and most preferably has a cutting angle of approximately 60 degrees.

Although embodiments of the invention have been described above, it is not limited thereto and it will be apparent to those skilled in the art that numerous modifications form part of the present invention insofar as they do not depart from the spirit, nature and scope of the claimed and described invention.

What is claimed is:

1. An improved support ring adapted to support a rupturable rupture disc member in a rupture disc assembly, the support ring including an upper surface, a lower surface, a central aperture defined by an inner peripheral edge and at least one tear-initiating projection, wherein the improvement comprises:

cutting means extending inwardly from the inner peripheral edge and below the upper surface and adapted to cut the rupture disc member; and said cutting means including a plurality of curved cutting portions, each of the plurality of curved cutting portions including an inner arc section extending closer to the inner peripheral edge than other portions of the curved cutting portion.

2. The support ring of claim 1 wherein the inner arc section of at least one of the plurality of curved cutting portions extends to the inner peripheral edge.

3. The support ring of claim 1 wherein two of the plurality of curved cutting portions extending from either side of the at least one tear-initiating projection.

4. The support ring of claim 1 further including a hinge member extending inwardly from the inner peripheral edge and below the upper surface, the hinge member configured to have a cutaway portion of the rupture disc fold over the hinge member upon rupture of the disc.

5. The support ring of claim 1 wherein the cutting means includes four curved cutting portions and the at least one tear-initiating projection comprises three tear-initiating projections.

6. The support ring of claim 5 wherein the four cutting portions and three projections define a clover leaf pattern configuration.

7. The support ring of claim 1 wherein the cutting means and the at least one tear-initiating projection extend into a dome-shaped central portion of the rupture disc.

8. The support ring of claim 1 wherein the plurality of curved cutting portions and the at least one tear-initiating projection define a continuous cutting edge.

9. The support ring of claim 8 wherein the continuous cutting edge has an angle between 50 and 70 degrees with respect to a vertical axis.

10. The support ring of claim 1 wherein the inner peripheral edge has a transition radius and a transition diameter with respect to the cutting means extending therefrom and said transition radius and said transition diameter being substantially the same as a transition radius and transition diameter of the disc defined by a transition region between an annular rim portion and a domed central portion of the disc.

11. A rupture disc support ring comprising:

a substantially flat support ring having a pair of opposed planar upper and lower surfaces and an inner peripheral edge defining a central aperture;

at least one tear-initiation projection for initiating a tear in a reverse buckling disc, said projection extending inwardly from the ring inner peripheral edge and below the ring upper surface; and cutting means extending to either side of said tear-initiation projection, said cutting means including at least one curved cutting portion, the at least one curved cutting portion including an inner arc extending closer to the inner peripheral edge than other portions of the curved cutting portion.

12. The support ring of claim 11 wherein the inner arc section of at least one of the plurality of curved cutting portions extends to the inner peripheral edge.

13. The support ring of claim 11 further including a hinge member extending inwardly from the inner peripheral edge and below the upper surface, the hinge member configured to have a cutaway portion of the rupture disc fold over the hinge member upon rupture of the disc.

14. The support ring of claim 11 wherein the cutting means includes four curved cutting portions and the at least one tear-initiating projection comprises three tear-initiating projections.

15. The support ring of claim 14 wherein the four cutting portions and three projections define a clover leaf pattern configuration.

16. The support ring of claim 11 wherein the cutting means and the at least one tear-initiating projection extend into a dome-shaped central portion of the rupture disc.

17. The support ring of claim 11 wherein the plurality of curved cutting portions and the at least one tear-initiating projection define a continuous cutting edge.

18. The support ring of claim 17 wherein the continuous cutting edge has an angle between 50 and 70 degrees with respect to a vertical axis.

19. The support ring of claim 11 wherein the inner peripheral edge has a transition radius and a transition diameter with respect to the cutting means extending therefrom and said transition radius and said transition diameter being substantially the same as a transition radius and transition diameter of the disc defined by a transition region between an annular rim portion and a domed central portion of the disc.

20. A rupture disc and support member assembly for use with an upper holding member having a bore and a lower annular surface, the rupture disc and support member assembly comprising:

a rupture disc and a support ring adapted to be positioned in alignment with and below the lower annular surface of the upper holding member;

the rupture disc including an annular rim portion and a domed central portion, the rupture disc positioned below the support ring and domed central portion extending downwardly;

the support ring including an annular peripheral section aligned with said annular rim portion of said rupture disc, the support ring including at least one cutting projection extending downwardly from said peripheral section, in close proximity to said domed section for initiating tear in said domed section, and a cutting edge including arcuately curved cutting portions extending from each side of said at least one cutting projection, said cutting portions each including an inner arc section extending closer to the annular peripheral section than other portions of the arcuately curved cutting portion.

21. The rupture disc and support member assembly of claim 20, wherein said support ring includes a plurality of spaced cutting projections.

22. The rupture disc and support member assembly of claim 20 further including a hinge member extending inwardly from the inner peripheral edge and below the upper surface, the hinge member configured to have a cutaway portion of the rupture disc fold over the hinge member upon rupture of the disc.

23. The rupture disc and support member assembly of claim 20 wherein the inner arc section of at least one of the plurality of curved cutting portions extends to the inner peripheral edge.

24. A bursting disc assembly comprising:

a lower tubular holding member having a bore and spaced apart upper and lower annular surfaces;

a reverse buckling bursting disc including an annular rim portion and a domed central portion, the disc seated on the upper surface of the lower holding member and the domed central portion extending down into the bore of the lower holding member;

a support member having a peripheral annular section seated on said annular rim portion of the bursting disc and at least one tear initiating member extending downwardly within said domed portion and in close proximity thereto, and a cutting edge including arcuately curved cutting portions extending from each side of said at least one tear initiating member, said cutting portions each including an inner arc section extending closer to the annular peripheral section than other portions of the arcuately curved cutting portion; and an upper tubular holding member having a bore and spaced apart upper and lower annular surfaces, the lower surface is seated on said peripheral annular section of said support member.

25. The bursting disc assembly of claim 24 further including a plurality of spaced cutting projections.

26. The bursting disc assembly of claim 24 further including a hinge member extending inwardly from the inner peripheral edge and below the upper surface, the hinge member configured to have a cutaway portion of the rupture disc fold over the hinge member upon rupture of the disc.

27. The bursting disc assembly of claim 24 wherein the inner arc section of at least one of the plurality of curved cutting portions extends to the inner peripheral edge.

28. The bursting disc assembly of claim 24 wherein the support ring includes an angled cutting portion that extends away from the upper holding member and the lower surface of the upper holding member includes a projection extending downwardly from the lower surface, said projection configured to support the angled cutting portion of the support ring.

29. An improved support holder adapted for use with a rupture disc assembly including a support ring having an angled cutting portion wherein the support ring is seated on the support holder such that the angled cutting portion extends away from the support holder, the support holder including an upper and a lower surface, a central aperture and an inner peripheral wall bounding said central aperture, wherein the improvement comprises:

one of said upper and lower surfaces including a projection extending beyond one of said upper or lower surfaces, said projection bounding at least a portion of said central aperture and configured to support the angled cutting portion of the support ring seated on the one of said upper and lower surfaces.

30. The support holder of claim 29 wherein there are a plurality of projections.

31. A support holder comprising:

an upper and a lower surface;

a central aperture defined by an inner peripheral wall of the holder; and one of said upper and lower surfaces including a projection extending beyond one of said upper or lower surfaces, said projection bounding at least a portion of said central aperture, said projection configured to support an angled cutting portion of a support ring seated on the one of said upper and lower surfaces wherein the angled cutting portion extends away from the support holder.

32. A support holder assembly comprising:

a) first and second holder members;

b) the first holder member including:

i) an upper and a lower surface;

ii) a central aperture defined by an inner peripheral wall of the holder; and iii) one of said upper and lower surfaces including a projection extending beyond one of said upper or lower surfaces, said projection bounding at least a portion of said central aperture, said projection configured to support an angled cutting portion of a support ring seated on the one of said upper and lower surfaces wherein the angled cutting portion extends away from the support holder.

33. The support holder assembly of claim 32 wherein each of said holder members further includes a cooperating mating portion to permit said first and second holders to releasably engage each other.

34. The support holder assembly of claim 32 wherein at least one of said holding members includes positioning means for positioning said support ring in a predetermined direction between said holding members.

35. The support holder assembly of claim 34 wherein said positioning means comprises a projection extending from one of said holding members, the other of said holding members having a recess adapted to receive said projection, and said support ring having an opening for receiving said projection and to position said support ring between said holding members.

* * * * *